US008610724B2

(12) United States Patent
Garg

(10) Patent No.: US 8,610,724 B2
(45) Date of Patent: Dec. 17, 2013

(54) SYSTEMS AND METHODS FOR WEBPAGE ADAPTIVE RENDERING

(75) Inventor: Dinesh K. Garg, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 173 days.

(21) Appl. No.: 13/193,972

(22) Filed: Jul. 29, 2011

(65) Prior Publication Data
US 2013/0027408 A1    Jan. 31, 2013

(51) Int. Cl.
*G06T 13/00*    (2011.01)
(52) U.S. Cl.
USPC .................... 345/473; 345/418; 345/949
(58) Field of Classification Search
None
See application file for complete search history.

(56) References Cited

U.S. PATENT DOCUMENTS

| 5,515,494 | A | * | 5/1996 | Lentz | 715/797 |
| 6,157,933 | A | | 12/2000 | Celi, Jr. et al. | |
| 6,720,979 | B1 | | 4/2004 | Shrader | |
| 2002/0176636 | A1 | * | 11/2002 | Shefi | 382/285 |
| 2004/0233171 | A1 | * | 11/2004 | Bell et al. | 345/168 |
| 2005/0225552 | A1 | * | 10/2005 | Anand | 345/473 |
| 2008/0195692 | A1 | | 8/2008 | Hayosh et al. | |

OTHER PUBLICATIONS

"Optimizing Performance for the Adobe Flash Platform", May 2, 2011, pp. 23-33, Publisher: Adobe Systems Incorporated and its licensors, Published in: US.

* cited by examiner

*Primary Examiner* — Said Broome
(74) *Attorney, Agent, or Firm* — Neugeboren O'Dowd PC

(57) ABSTRACT

This disclosure describes systems, methods, and apparatus for rendering animated images on a webpage. In particular, animated images that are visible are rendered as animations, whereas animated images that are not visible, those that can only be seen by scrolling the webpage, are rendered as a single static image until the webpage is scrolled such that these animated images are visible. At such point they can be rendered as animations.

20 Claims, 5 Drawing Sheets

SYSTEMS AND METHODS FOR WEBPAGE ADAPTIVE RENDERING

BACKGROUND

1. Field

The present disclosed embodiments relate generally to webpage rendering, and more specifically to reducing CPU load during rendering of animated images on a webpage.

2. Background

Webpages typically render multi-frame or animated images by rendering an entire webpage including images outside the viewport. Yet, rendering all animated images, inside and outside the viewport, taxes the CPU. The greater the number and speed of animations on the webpage, the harder the CPU works to render those animations. There is therefore a need in the art for systems and methods for rendering animated images of webpages that are less-taxing on the CPU.

SUMMARY

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Some embodiments of the disclosure may be characterized as a method of rendering animated images on a webpage. Such embodiments include receiving a request to render a webpage and identifying animated images to be rendered within the webpage. These embodiments further include identifying those of the animated images to be rendered entirely outside of a viewport of the webpage as non-visible animated images and identifying those of the animated images to be rendered at least partially inside the viewport of the webpage as visible animated images. The embodiments further include rendering only a first frame of the non-visible animated images, and sequentially rendering a plurality of frames of the visible animated images.

Other embodiments of the disclosure may also be characterized as a computing apparatus having a web browser, a viewport, and a rendering manipulator. The web browser receives a request to display a webpage, and the viewport displays at least a portion of the webpage. The rendering manipulator module analyzes a plurality of animated images to be rendered in the webpage, identifies ones of the animated images to be rendered at least partially within the viewport as visible animated images and instructs that two or more frames of the visible animated images be rendered. The rendering manipulator module also identifies ones of the animates images to be rendered entirely outside the viewport as non-visible animated images and instructs that only one frame of the non-visible animated images be rendered Other embodiments of the disclosure can further be characterized as an apparatus having means for rendering animated images of a webpage. The apparatus includes a means for receiving a request to display a webpage and a means for identifying animated images to be rendered within the webpage. The apparatus further includes a means for identifying those of the animated images to be rendered entirely outside of a viewport of the webpage as non-visible animated images and identifying those of the animated images to be rendered at least partially inside the viewport of the webpage as visible animated images. The apparatus also includes a means for rendering only a first frame of the non-visible animated images, and a means for sequentially rendering a plurality of frames of the visible animated images.

Further embodiments of the disclosure can be characterized as a non-transitory tangible computer readable storage medium, encoded with processor readable instructions to perform a method of rendering animated images of a webpage. The medium including instructions for receiving a request to render a webpage and for identifying animated images to be rendered within the webpage. The medium further includes instruction for identifying those of the animated images to be rendered entirely outside of a viewport of the webpage as non-visible animated images and identifying those of the animated images to be rendered at least partially inside the viewport of the webpage as visible animated images. The medium includes instructions for rendering only a first frame of the non-visible animated images and for sequentially rendering a plurality of frames of the visible animated images.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

Figure 1:
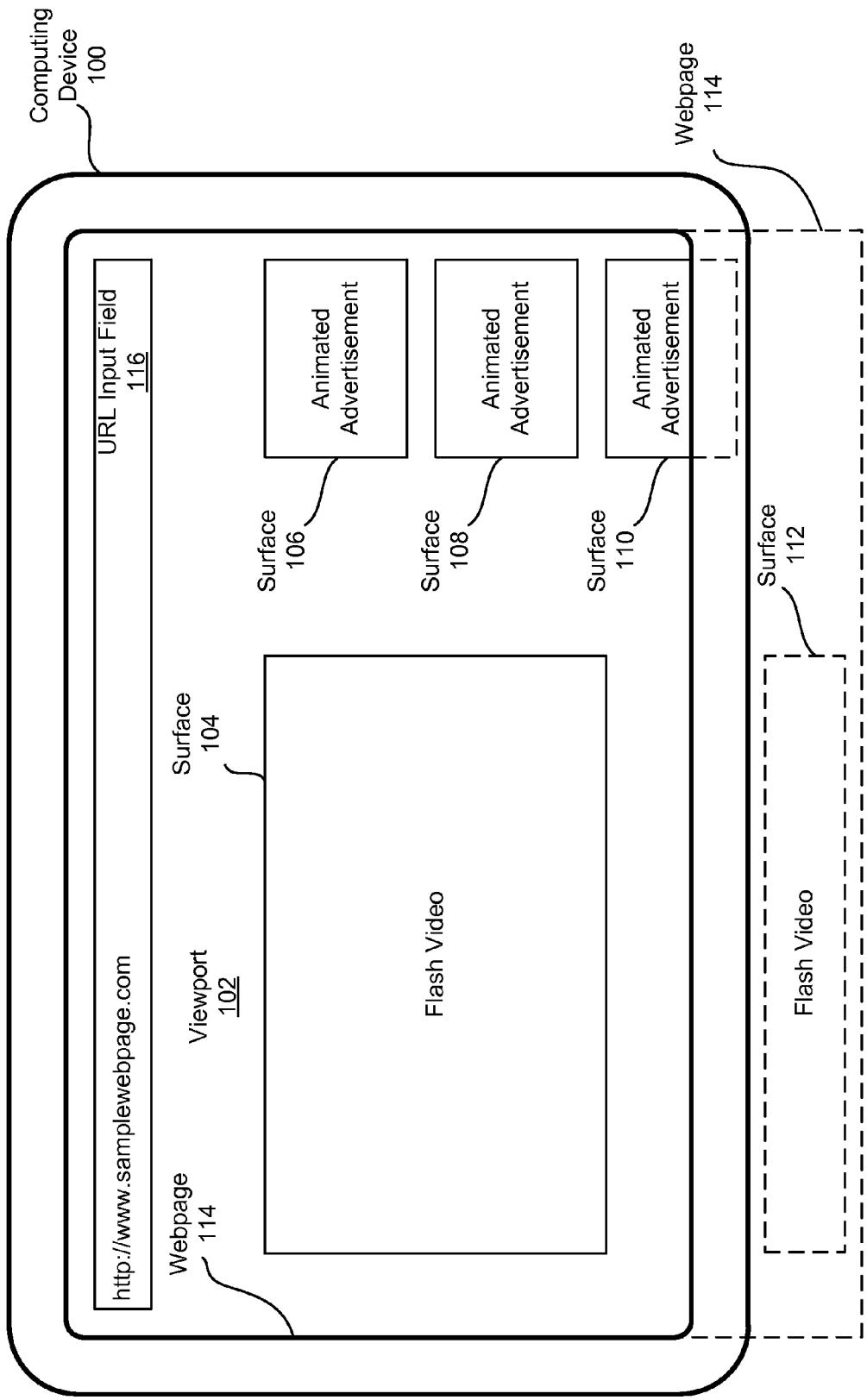
FIG. 1 illustrates a display of a computing device according to one embodiment of this disclosure.

FIG. 1 illustrates a display of a computing device 100 according to one embodiment of this disclosure. The display includes a viewport 102 in which a webpage 114 can be displayed. The illustrated webpage 114 is larger than the viewport 102 and thus a user can either zoom out or scroll the webpage 114 in order to see those portions of the webpage 114 that are not at first visible. For instance, the illustrated webpage includes a first and second surface 104, 112, each having a flash video rendered therein. While the first surface 104 is rendered inside the viewport and is thus a visible animated image, the second surface 112 is entirely outside the viewport and is thus a non-visible animated image. To see the second surface 112 and the flash video rendered therein, a user may scroll the webpage downward or zoom out thus changing the viewport 102 and bringing the second surface 112 into the viewport 102. Similarly, the webpage includes third, fourth, and fifth surfaces 106, 108, 110 each having an animated advertisement rendered therein. The third and fourth surfaces 106, 108 are rendered within the viewport and are visible animated images. The fifth surface 110 is partially rendered inside the viewport and is thus considered a visible image for the purpose of this disclosure. In other words, non-visible animated images, or at least one frame of such an image, are rendered entirely outside of the viewport, while visible animated images are rendered either entirely or partially within the viewport 102. The webpage 114 can also include a URL input field 116.

One known method of rendering a webpage such as that in FIG. 1 enables animation for all animated images of all surfaces regardless of their visibility within the viewport. This places a high load on the CPU, but allows rapid scrolling since animation of non-visible images is enabled before scrolling puts them in the viewport 102. To allow rapid scrolling yet reduce CPU load, this disclosure enables animations of animated images that are at least partially within the viewport 102, and disables animations of animated images (renders a single frame) that are outside the viewport 102. CPU resources are thus not taxed to render non-visible animated images, and since one frame of the non-visible animated images is rendered, users can scroll without seeing blank images appear in the viewport. Instead, the single frame will be visible to a user for a moment during scrolling, and during that moment animations can be enabled such that the user experiences a seamless scrolling experience without taxing the CPU.

The computing device 100 is illustrated as a tablet computer or smartphone, but can also take other forms such as desktop computers, laptop computers, cellular telephones, and embedded computers to name just a few non-limiting examples. While flash videos and animated advertisements are used to illustrate animated images in FIG. 1, one skilled in the art will recognize that any other type of animated image can also populate the one or more surfaces of a webpage as herein disclosed. This disclosure tends to use the action of scrolling when describing ways of changing the viewport, yet one skilled in the art will recognize that zooming in and out along with other methods of changing the viewport are also encompassed in this disclosure.

Figure 2:
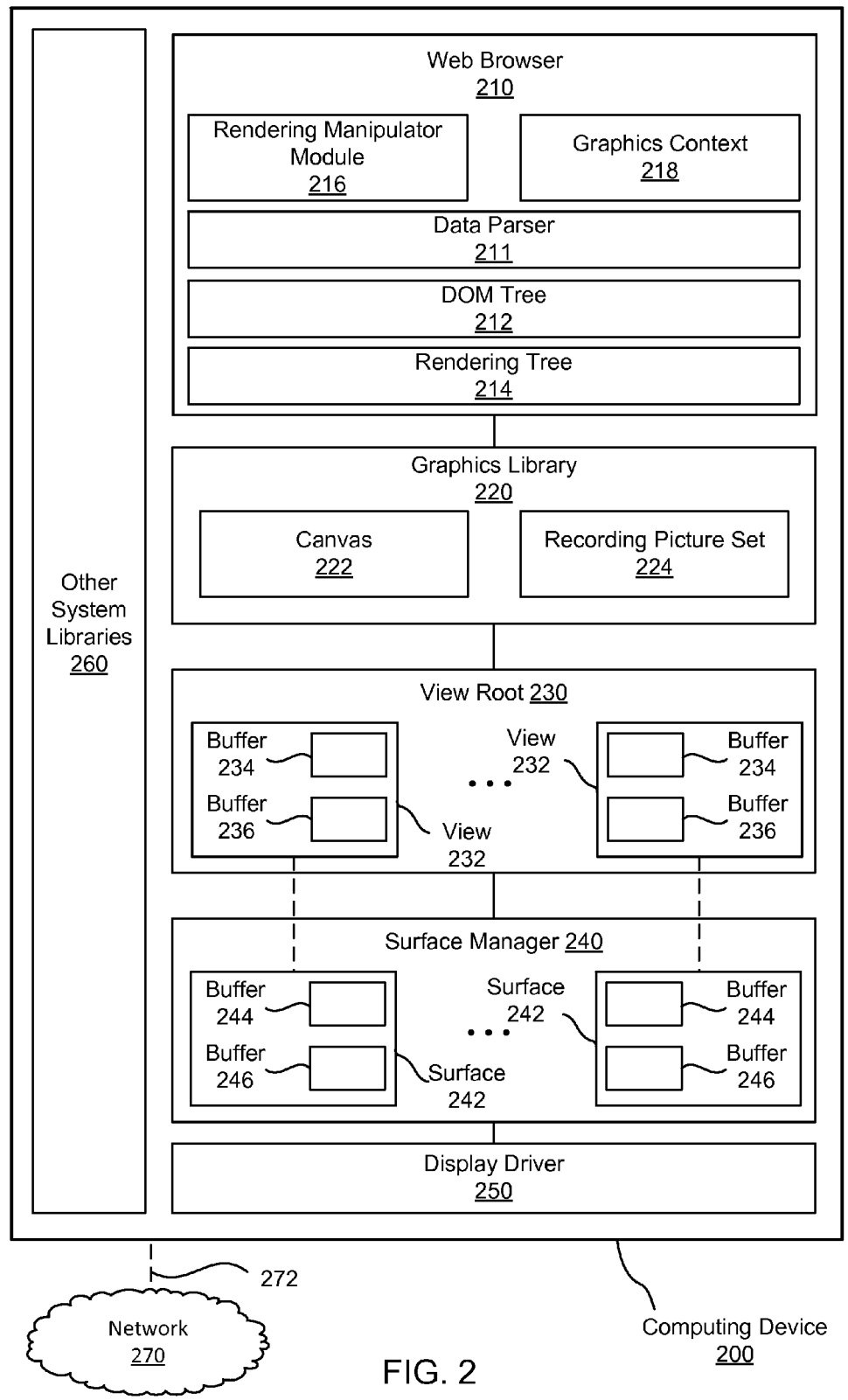
FIG. 2 illustrates a block diagram of a computing device configured to render animated images according to at least one embodiment of this disclosure.

FIG. 2 illustrates a block diagram of a computing device 200 configured to render animated images according to at least one embodiment of this disclosure. The computing device 200 renders animated images on webpages with reduced CPU load. The computing device 200 (e.g., cellular phone, smartphone, laptop computer, tablet computer, etc.) includes at least a web browser 210, a graphics library 220, a view root 230, a surface manager 240, a display driver 250, other system libraries 260, and a wired or wireless connection 272 to a network 270 (e.g., the Internet). Webpages can be stored on the Internet or on the computing device 200 via a computer readable medium (e.g., SD card or onboard FLASH memory).

Stored webpages are viewed via the web browser 210, which generally handles webpage retrieval, user input/output, control, and rendering. The web browser 210 passes information regarding the same to the graphics library 220 which stores drawing commands. The graphics library 220 then provides a canvas 222 to a view root 230, which manages a plurality of views 232 and manages commands and processing associated with each canvas 222 (e.g., zooming of an image). The view root 230 is analyzed to identify views 232 and a corresponding surface 242 is calculated for each view 232. The views 232 are passed to a surface manager 240, which decides which surfaces 242 and which portions of surfaces 242 are visible (on top of all other surfaces 242) and are thus to be displayed on top of other surfaces 242. For example, a user may be playing a game, so the game's surface will be on top. If the user decides to switch to an open web browser, then the web browser must be rendered on top of the surface for the game. Thus, the surface manager 240 renders the surface for the browser and may disable the surface for the game (or at least portions of the surface that are underneath the surface of the web browser). The other system libraries 260 support the web browser 210 by providing services to the web browser 210 and to applications running on the web browser 210.

The web browser 210 can receive a request to load and display a webpage and can also render and display the requested webpage. The web browser 210 can retrieve data used to render the webpage from a network 270 (e.g., the Internet). This data can be stored or cached on a computer readable medium of the computing device 200. It then parses the data via data parser 211 and constructs a document object model (DOM) tree 212 corresponding to all aspects of the webpage. From the DOM tree 212 the web browser 210 generates a rendering tree 214 describing graphical aspects of the webpage. The graphics context 218 can be a handle for all graphical activities (e.g., panning and zooming).

The web browser 210 also determines whether animated images are to be enabled on the webpage. If animated images are not to be rendered, then a layout is created and traditional methods of painting static images can be used. On the other hand, if one or more animated images are to be rendered, then the web browser 210 creates a layout and then determines whether animations are to be rendered inside or outside a viewport of the computing device 200. In particular, the web browser 210 determines if the animated images are visible or non-visible animated images where visible animated images are those that are to be rendered at least partially inside the viewport and non-visible animated images are those that are to be rendered entirely outside the viewport.

When user activity causes the viewport to change (e.g., via user scrolling or zooming), the web browser 210 can repeat the above steps starting by recreating or modifying the rendering tree 214. In other words, whenever the viewport changes, the web browser 210 determines which animated images are to be visible or non-visible and then adjusts or creates or deletes associated timers or leaves the timers as they were. As such, the rendering tree 214 can continuously or periodically refresh. The web browser 210 also engages in non-graphical aspects of operating the webpage (e.g., receiving inputs from users, communicating with the network 270, contacting servers to send and receive data, etc.).

Rendering a web page can include rendering animated images of the webpage, which further can include generating a recording picture set 224 for each animated image. Where the animated image is associated with an enabled timer, the recording picture set 224 is updated every time the timer fires (or expires) to render the next sequential frame of the multiple frames of the animated image.

A rendering manipulator module 216 that can be a part of the web browser 210 can perform various ones of the above-described functions. For instance, the rendering manipulator module 216 can analyze images to be rendered in the webpage and determine if any images to be rendered are animated images (e.g., have multiple frames). The rendering manipulator module 216 can also analyze the identified animated images and determine whether the animated images are to be rendered inside (visible) or outside (non-visible) a viewport of the computing device 200. The rendering manipulator module 216 can instruct that two or more frames of the visible animated images be rendered while instructing that only a single frame of the non-visible animated images be rendered. In particular, the rendering manipulator module 216 can enable or disable timers associated with visible and non-visible animated images, respectively. The timers can then manipulate the recording picture set 224.

The rendering manipulator module 216 can be implemented in software, firmware, hardware, or a combination of the above. In some embodiments, the rendering manipulator module 216 can be responsible for all aspects of rendering while in other embodiments, the rendering manipulator module 216 can have a more limited role—for instance, identifying which images to display as static single-frame images (e.g., non-visible animated images) and which images to display as animated multi-frame images (e.g., visible animated images).

The graphics library 220 manages graphics or drawings from a graphical standpoint. It can store a recording picture set 224 for each view 232, where each recording picture set 224 for an animated image is modified every time a timer fires (or expires). The timers determine the sequential timing of multiple frames in each animated image and when they fire (or expire) the picture recording set 224 associated with each animated image is updated in accordance with a next frame of the multiple frames that make up each animated image. Timers are enabled for visible animated images and disabled for non-visible animated images. Alternatively, timers are not created for animated images to be rendered entirely outside the viewport. Each recording picture set 224 defines or is associated with one of the views 232. Those portions of the recording picture set 224 that are visible within the viewport make up a canvas 222. The canvas 222 includes commands for rendering one or more images (e.g., bitmap) and includes image style information. Each canvas 222 includes instructions to create content for one surface 242 using a bitmap or other image file type.

The view root 230 includes a plurality of views 232 each having a first and second buffer 234, 236. The view root 230 controls operations from an applications point of view. Each view 232 contains layout information where a layout may extend outside a viewport. Each view 232 is associated with one recording picture set 224, one canvas 222, and one surface 242. In some cases a view 232 can extend outside a viewport and in these cases the canvas 222 can represent a portion of the view 232 that is within the viewport. The views 232 also support handling and implementation of logic of user inputs such as zoom, scroll, and keyboard and mouse inputs. For example, where a user attempts to zoom an application in the web browser 210, the web browser 210 can receive the event and pass it to the view root 230, which passes the event to each view 232. The views 232 can then process the event and the views 232 can update their respective canvases 222 per the user request to zoom. Exemplary views 232 include a URL input field, a flash video, and a webpage background, to name three non-limiting examples.

In terms of a coding hierarchy, web browser applications can be parents of the view root, which can be parents of the views 232, which can be parents of the canvas 222 and the surfaces 242.

While "view" can refer to an ANDROID coding class, and "view root" can refer to the root of the view class, it should be understood that the views 232 in this disclosure encompass software controlling and managing images and controls associated with images (e.g., user request to zoom or scroll and animated image), are not limited to ANDROID and can be implemented via their analogues in other computing environments such as ANDROID and IOS.

The first buffer 234 can contain data corresponding to a portion of an image file (e.g., a bitmap) and can provide this data to the display driver 250 for painting to a display device. The second buffer 236 is a modified version of the first buffer 234. Modifications can arise due to various reasons such as a user typing in a textbox on a webpage. The buffers 234, 236 may contain data for the entire image file rather than just a portion of it. When the viewport changes (e.g., via user scrolling), data from the second buffer 236 can be passed to the display driver 250 to account for image data missing from the first buffer 234. At the same time, the first buffer 234 can be filled with new image data thus taking on the role of the second buffer 236. The first and second buffers 234, 236 are thus interchangeable and may be swapped when a request to display the buffers 234, 236 is made. Alternatively, the first and second buffers 234, 236 can be used for separate tasks where information stored in one buffer can be copied to the other buffer.

The views 232 can be overlapping or lying atop other views 232, and thus before being rendered the view root 230 is analyzed to identify views 232, and corresponding surfaces 242 in the surface manager 240 (or windows manager) are generated. Each surface 242 can have a first and second surface buffer 244, 246 corresponding to the first and second buffers 234, 236 of the views 232. The surface manager 240 determines which applications, and thus which surfaces 242, are to be displayed atop other applications (and thus surfaces). For instance, when one surface 242 overlaps another, only a portion of the bottom surface 242 that is not overlapping with the top surface 242 will be rendered. With this determination made, the surface manager 240 passes a final two-dimensional surface to a display driver 250 that provides instructions to one or more graphics devices (not illustrated) to display the webpage.

The display driver 250 is an interface between the software components herein described and graphics display hardware such as a display (e.g., LCD or LED touch-screen display of a smartphone or tablet computer).

The web browser 210, surface manager 240, other system libraries 260, and the display driver 250, are software and/or firmware components that can be implemented in one or more hardware components (e.g., applications and baseband processors of a smartphone).

Figure 3:
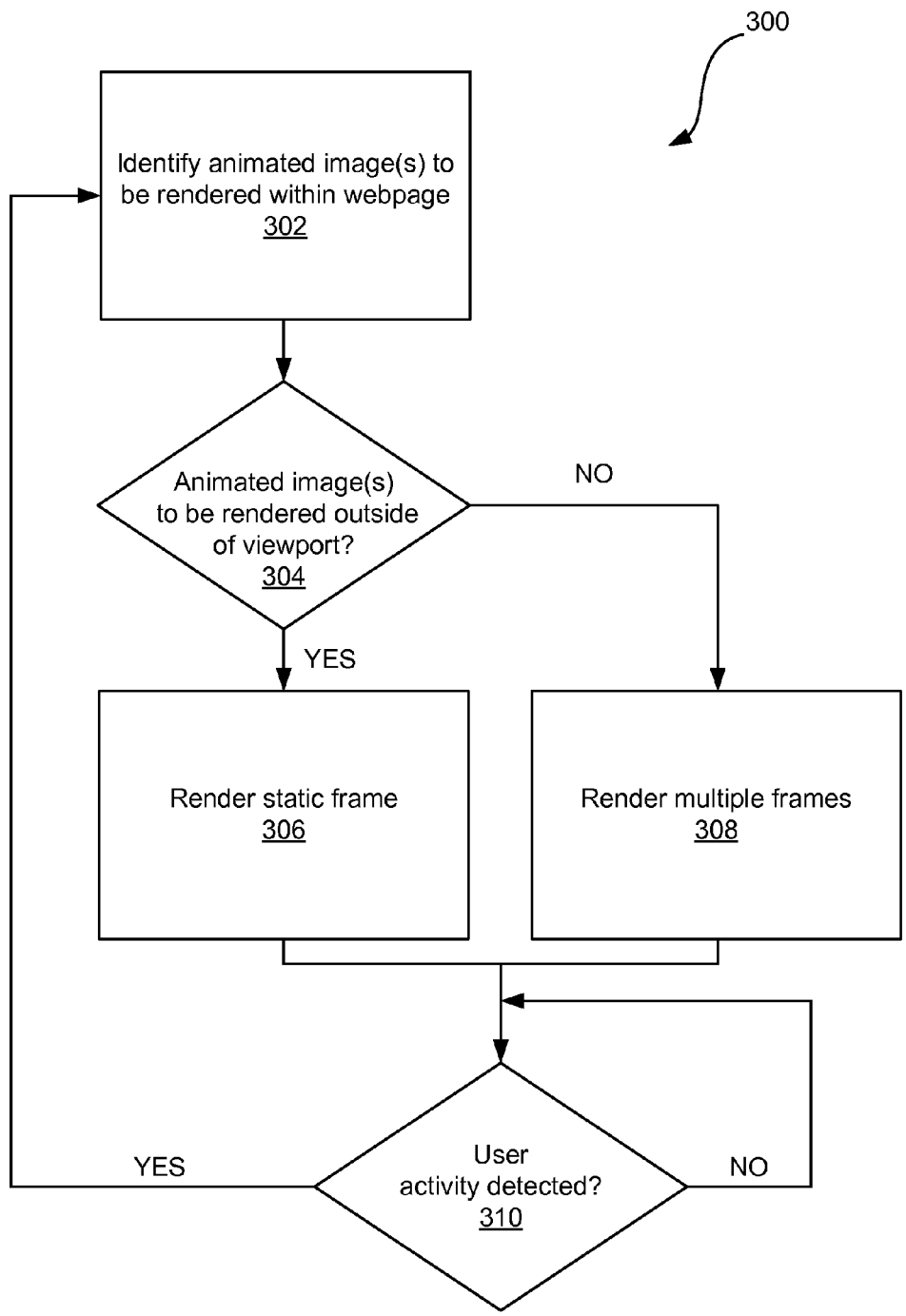
FIG. 3 illustrates one embodiment of a method of rendering animated images on a webpage.

FIG. 3 illustrates one embodiment of a method of rendering animated images on a webpage. The method 300 can include identifying animated images that are to be rendered on a webpage in an identify operation 302. The method 300 then determines which images are to have animation enabled—those to be rendered entirely outside the viewport (non-visible animated images) have their animation disabled while those to be rendered partially or wholly inside the viewport (visible animated images) are to have their animation enabled. This decision is made by a first decision 304. Images to be rendered entirely outside the viewport (non-visible animated images) need not be rendered as CPU-intensive animations, and are instead rendered as a single static frame in a render static frame operation 306 that disables (or does not create in the first place) a timer associated with each of the non-visible animated images. Alternatively, images to be rendered at least partially within the viewport (visible animated images) are rendered via a more CPU-intensive animation method involving rendering multiple frames of the visible animated image in a render multiple frames operation 308 that enables (or creates) a timer associated with each of the visible animated images. The above operations 302, 306, 308 and decision 304 can be repeated if the viewport changes—in other words, when a user scrolls the viewport or takes some other user activity that changes the viewport. Thus, the second decision 310 monitors user activity and sends the method 300 back to the identify operation 302 if user activity is detected, and more specifically when a user request for a viewport scrolling or change is received.

In more detail, the method 300 could also include requesting a webpage, retrieving data used to render the requested webpage from a network and caching this data, creating a DOM tree from the data, and creating a rendering tree from the DOM tree. A layout is computed from the rendering tree and scanned to determine if animated images are in the rendering tree via identify operation 302.

By disabling timers of non-visible animated images, the method 300 avoids the CPU-intensive updating of recording sets for at least some animated images in a webpage—those that are not visible. Since the timers are disabled for non-visible animated images, only a single frame of the multi-frame images is rendered, and the recording sets are not updated or modified by the firing (or expiring) of the timers.

In an embodiment, the method 300 can apply to rendering webpages on mobile computing devices such as cellular phones, smart phones, and tablet computers, to name just a few non-limiting examples.

Figure 4A:
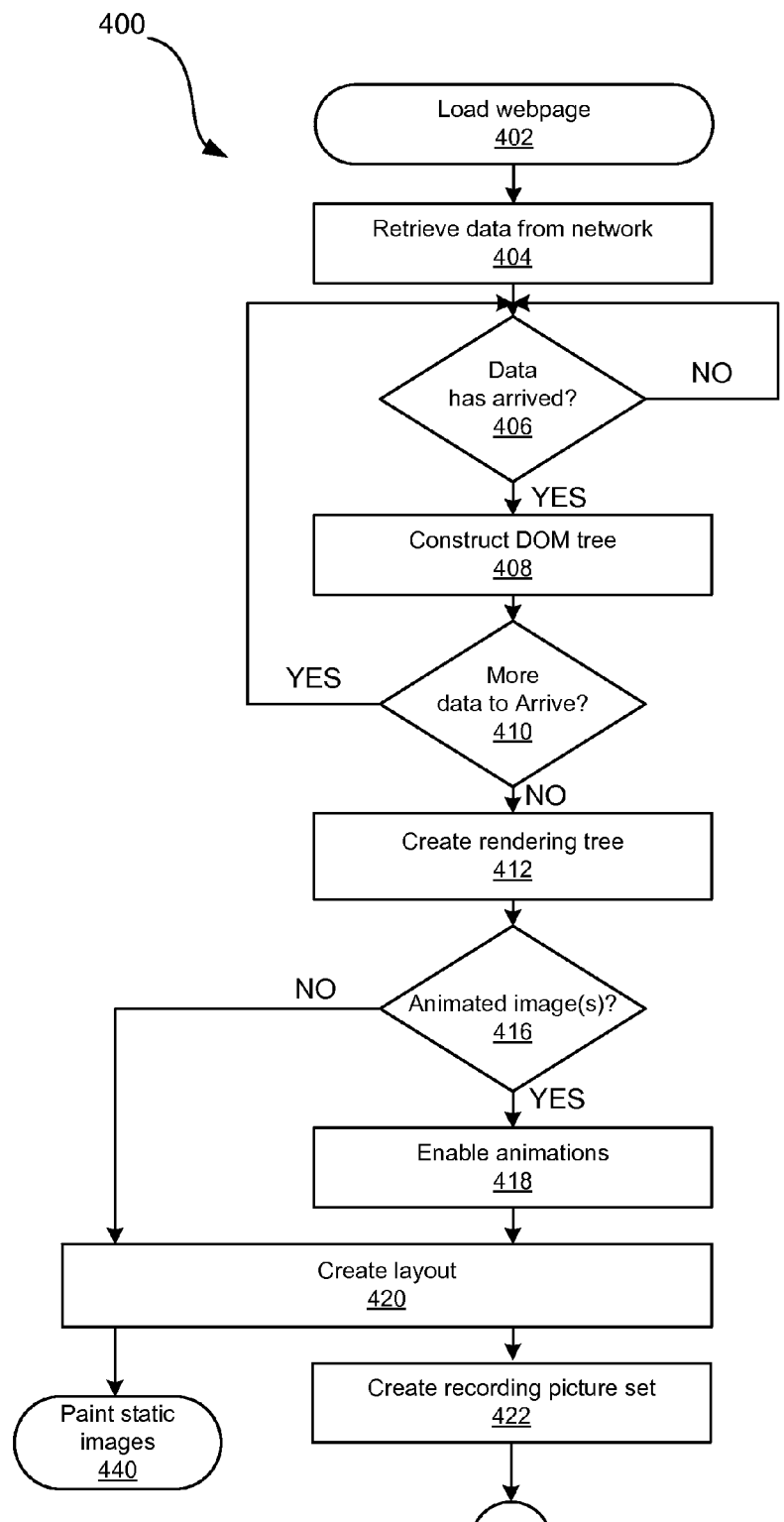
FIGS. 4A and 4B illustrate another method of rendering animated images on a webpage.
Figure 4B:
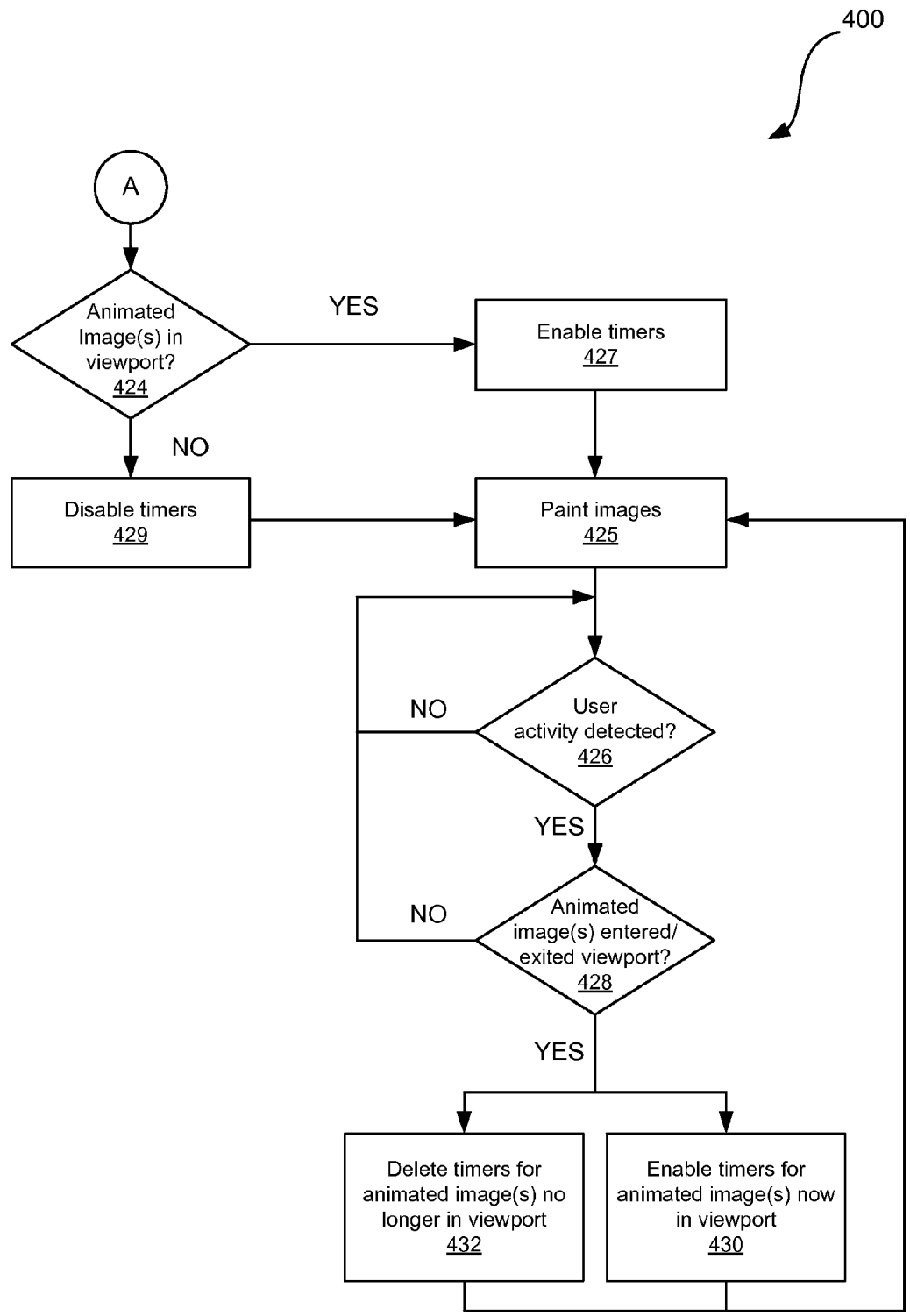

FIGS. 4A and 4B illustrate another method 400 of rendering animated images on a webpage. The method 400 begins with the loading of a webpage or a request for loading of a webpage, for instance when a user enters a URL into a URL field of a web browser, in a load webpage operation 402. The method then retrieves data used to render the requested webpage from a network such as the Internet in a retrieve operation 404. The method 400 then awaits the data's arrival in a data has arrived decision 406 that loops until the data has arrived. A DOM tree is then constructed in construct DOM tree operation 408. If there is more data arriving from the network, then the more data to arrive decision 410 returns the method 400 to the data has arrived decision 406. This repeats until all data has arrived, and then the more data to arrive decision 410 allows the method 400 to create a rendering tree in create rendering tree operation 412. The animated image(s) decision 416 then determines if any images to be rendered in the webpage are animated. If not, then a layout is created in a create layout operation 420 and the static images are painted via traditional means in paint static images operation 440 and the method 400 comes to an end. However, if there are animated images, then the animated image(s) decision 416 directs the method 400 to the enable animations operation 418 where animations are enabled. The layout is then created in create layout operation 420 and a recording picture set is created in create recording picture set operation 422. The method continues at the top of FIG. 4B.

Each animated image includes a timer that indicates when each frame of the multiple frames making up each animated image is to be rendered. When a timer fires (or expires) a recording picture set associated with the animated image is updated in accordance with the next sequential frame of the multi-frame animated image. This updating of the recording picture set is a processing-heavy operation, and thus avoiding such updates whenever possible is a goal of this disclosure. Thus, to conserve CPU resources, the timers, and thus updating of the recording picture sets is disabled for animated images not in the viewport. Animated images with disabled timers are thus rendered as the first frame of the non-visible animated image. The animated image(s) in viewport decision 424 in FIG. 4B handles this aspect of the disclosure by analyzing the layout and determining which animated images are to be rendered inside and outside of the viewport. Those that are to be rendered at least partially within the viewport (visible animated images) have their timers enabled (or created) in an enable timers operation 427. Those that are to be rendered entirely outside the viewport (non-visible animated images) have their timers disabled in a disable timers operation 429. Alternatively, the timers associated with non-visible animated images can be deleted, or the create recording picture set operation 422 can entail not creating timers associated with non-visible animated images. This implies that the order of the animated image(s) in viewport decision 424 relative to the create recording picture set operation 422 is variable. Once timers have been handled, the animated images are passed to a display driver that paints the animated images to a display device in a paint images operation 425. Painting is performed for those portions of a webpage that are visible within the viewport. In one embodiment, the animated image(s) in viewport decision 424, the enable timers operation 427, and the disable timers operation 429 can be carried out by a rendering manipulator module such as the rendering manipulator module 216 in FIG. 2.

In some embodiments, the method 400 can continue after the paint images operation 425 to account for user activity such as requested changes to the viewport (e.g., scrolling). A user activity detected decision 426 operates until user activity is detected at which point the method 400 determines if one or more animated images have at least partially entered the viewport or entirely left the viewport in a animated image(s) entered/exited viewport decision 426. If user activity is detected and either animated images have entered or exited the viewport, then the timers associated with the animated images entering or exiting the viewport are enabled or deleted via enable timers operation 432 and delete timers operation 430. All other timers remain the same. The method 400 then repaints the animated images according to the new timer configurations via paint images operation 425. If user activity is not detected or if one or more animated images have not entered the viewport, then the method 400 returns to the user activity detected decision 426. One skilled in the art will recognize that the order of the user activity detected decision 426 and the animated image(s) entered/exited viewport decision 428 is not limited and both decisions 426, 248 can even take place in an overlapping or simultaneous manner.

One of skill in the art will recognize that the various method steps of the method 400 can be interchangeable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described herein may be implemented in hardware, software, firmware, or any combination thereof. If implemented in software, the functions may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, operating on a processor and a display of a computing device, the method comprising:

receiving, via a processor, a request to render a webpage;
identifying, via the processor, animated images to be rendered within the webpage;
identifying, via the processor, those of the animated images to be rendered entirely outside of a viewport of the webpage as non-visible animated images and identifying those of the animated images to be rendered, so as to have at least a portion inside the viewport of the webpage, as visible animated images;
rendering, to a buffer, only a first frame of the non-visible animated images until the non-visible animated images are identified as visible animated images; and
sequentially rendering, to the display, a plurality of frames of the visible animated images.

2. The method of claim 1, further comprising:
repeating both identifying and both rendering operations after a user activity is detected.

3. The method of claim 1, further comprising generating a recording picture set that is updated upon an expiration of a timer associated with one of the visible animated images.

4. The method of claim 3, further comprising enabling a timer associated with each visible animated image and disabling a timer associated with each non-visible animated image.

5. The method of claim 1, wherein the computing device is a mobile computing device.

6. The method of claim 1, wherein the animated images include two or more frames rendered in sequential order.

7. The method of claim 1, further comprising rendering two or more frames of one of the non-visible animated images once a portion of the non-visible animated image enters the viewport.

8. A computing apparatus comprising:
a processor;
a display;
a buffer;
a web browser receiving a request to display a webpage to the display;
a viewport displaying at least a portion of the webpage, on the display; and
a rendering manipulator module, running on the processor of the computing apparatus, analyzing a plurality of animated images to be rendered in the webpage, the rendering manipulator module identifying ones of the animated images to be rendered, so as to have at least a portion within the viewport, as visible animated images and instructing that two or more frames of the visible animated images be rendered to the display, and identifying ones of the animated images to be rendered entirely outside the viewport as non-visible animated images and instructing that only one frame of the non-visible animated images be rendered to the buffer until the non-visible animated images are identified as visible animated images.

9. The computing apparatus of claim 8, wherein the viewport is smaller than the webpage.

10. The computing apparatus of claim 8, wherein the rendering manipulator module renders all frames of the visible animated images.

11. An apparatus comprising:
a processor;
a display;
a buffer;
a means for receiving a request to display a webpage to the display;
a means for identifying animated images to be rendered within the webpage on the display;
a means for identifying those of the animated images to be rendered entirely outside of a viewport of the webpage as non-visible animated images and identifying those of the animated images to be rendered, so as to have at least a portion inside the viewport of the webpage, as visible animated images;

a means for rendering only a first frame of the non-visible animated images to the buffer until the non-visible animated images are identified as visible animated images; and a means for sequentially rendering a plurality of frames of the visible animated images to the display.

12. The apparatus of claim 11 further comprising a means for enabling a timer associated with each visible animated image.

13. The apparatus of claim 12 further comprising enabling a timer associated with each non-visible animated image that becomes visible upon a modification of the viewport.

14. A non-transitory tangible computer readable storage medium, encoded with processor readable instructions to perform a method of rendering animated images of a webpage comprising, receiving a request to render a webpage;

identifying animated images to be rendered within the webpage;

identifying those of the animated images to be rendered entirely outside of a viewport of the webpage as non-visible animated images, and identifying those of the animated images to be rendered, so as to have at least a portion inside the viewport of the webpage, as visible animated images;

rendering only a first frame of the non-visible animated images until the non-visible animated images are identified as visible animated images; and sequentially rendering a plurality of frames of the visible animated images.

15. The non-transitory tangible computer readable storage medium of claim 14, further comprising:

repeating both identifying and both rendering operations after a user activity is detected.

16. The non-transitory tangible computer readable storage medium of claim 14, further comprising generating a recording picture set that is updated upon an expiration of a timer associated with one of the visible animated images.

17. The non-transitory tangible computer readable storage medium of claim 16, further comprising enabling a timer associated with each visible animated image and disabling a timer associated with each non-visible animated image.

18. The non-transitory tangible computer readable storage medium of claim 14, wherein the computing device is a mobile computing device.

19. The non-transitory tangible computer readable storage medium of claim 14, wherein the animated images include two or more frames rendered in sequential order.

20. The non-transitory tangible computer readable storage medium of claim 14, further comprising rendering two or more frames of one of the non-visible animated images once a portion of the one of the non-visible animated images enters the viewport.

* * * * *